United States Patent [19]

Walker

[11] Patent Number: 4,494,610

[45] Date of Patent: Jan. 22, 1985

[54] METHOD FOR RELEASING STUCK DRILL PIPE

[75] Inventor: Clarence O. Walker, Richmond, Tex.

[73] Assignee: Texaco Inc., White Plains, N.Y.

[21] Appl. No.: 483,789

[22] Filed: Apr. 11, 1983

[51] Int. Cl.$^3$ .......................... E21B 31/03; C09K 7/02
[52] U.S. Cl. .................................. 166/301; 252/8.5 A
[58] Field of Search ..................... 166/301; 252/8.5 A, 252/8.5 P, 8.5 M, 8.5 C, 8.55 R, 8.5 R

[56] References Cited

U.S. PATENT DOCUMENTS

| | | | |
|---|---|---|---|
| 3,217,802 | 11/1965 | Reddie et al. | 166/301 |
| 3,899,431 | 8/1975 | Hayes et al. | 252/8.5 C X |
| 4,012,329 | 3/1977 | Hayes et al. | 252/8.5 P |
| 4,356,096 | 10/1982 | Cowan et al. | 252/8.5 C |
| 4,411,800 | 10/1983 | Green et al. | 252/8.5 A |

OTHER PUBLICATIONS

Gray et al., *Composition and Properties of Oil Well Drilling Fluids,* Fourth Ed., 1980, Gulf Publishing Co., Houston, Tex., pp. 546, 547, 560 to 564.

*Primary Examiner*—Stephen J. Novosad
*Attorney, Agent, or Firm*—Robert A. Kulason; Jack H. Park; Richard A. Morgan

[57] ABSTRACT

A method is revealed for releasing a stuck drill string in a borehole of an underground formation by application of an additive fluid comprising a lower carbon number alcohol and optionally a weighting material and/or diluent.

13 Claims, No Drawings

METHOD FOR RELEASING STUCK DRILL PIPE

BACKGROUND OF THE INVENTION

1. Field of the Invention

This invention relates to a method for releasing a drill string which has become stuck in the borehole of an underground formation.

2. Description of the Prior Art

During drilling operations the drill string may become stuck and cannot be raised, lowered, or rotated. There are a number of mechanisms possible which may contribute to this problem. Namely these are () cuttings or slough build-up in the hole, (2) an undergage hole, (3) key-setting and (4) differential pressures.

This invention relates particularly to the differential pressure problem and is intended to be a novel approach to alleviating this situation.

Differential sticking may be defined as the sticking of the drill string against a permeable formation containing less pore fluid pressure than the hydrostatic pressure exerted by the drilling fluid column and usually occurs when the drill string remains motionless for a period of time. The mechanism by which this occurs involves the drill string coming into contact with the permeable zone, remaining quiescent for a period of time sufficient for mud cake to build up on each side of the point of contact, thus sealing the pipe against the borehole. The annular pressure exerted by the drilling fluid then holds the pipe against the borehole or the permeable zone.

Freeing of differentially stuck pipe is essentially a matter of reducing this pressure differential which exists across the pipe. One method used simply involves a reduction in fluid pressure by replacing the annular fluid wwith a less dense fluid allowing for less pressure differential to exist between the borehole and annulus. In some cases the borehole pressure may exceed the annular pressure which in turn allows the pipe to be blown out of the borehole.

One commonly used method to release stuck pipe is the spotting of an oil base mud in the hole opposite the stuck interval. With time, the mud cake around the stuck pipe becomes dehydrated from theoretically, hydraulic forces that are applied, the cake cracks and falls away freeing the pipe. Too, the oil mud may penetrate between the mud cake and pipe lubricating the area between the pipe and borehole resulting in less friction and quicker release. More often than not, an extensive period of time is necessary for the release to occur which results in an expensive loss of rig time.

In recent years, there has been a number of proprietary formulations developed aimed at releasing differentially stuck pipe. These also seem to require a great deal of time and the success ratio is somewhat questionable. U.S. Pat. No. 4,230,587, C. O. Walker, describes a method for releasing stuck drill pipe utilizing polyethylene glycol. U.S. Pat. No. 3,217,802 (Reddie et al) uses a petroleum base fluid with an alcohol coupling agent for the same purpose.

SUMMARY OF THE INVENTION

The present invention is an improved method for releasing a stuck drill string in the borehole of an underground formation. The method comprises contacting the stuck drill string with an additive composition comprising an alcohol selected from the group consisting of methanol, ethanol, normal propanol, isopropanol and mixtures thereof. The composition is effective in not only reducing the annular pressure exerted by the drilling fluid against the stuck drill string, but most importantly in chemically dehydrating and thereby destroying the drilling fluid mud cake.

DESCRIPTION OF THE PREFERRED EMBODIMENTS

The present invention is an improved method for releasing a stuck drill string in the borehole of an underground formation during drilling operations employing an aqueous drilling fluid, the method comprising contacting the stuck drill string with an additive composition effective in reducing the annular pressure exerted by the drilling fluid against the stuck drill string and chemically dehydrating the mud cake so as to release the stuck drill string. The additive composition comprises an alcohol selected from the group consisting of methanol, ethanol, normal propanol, isopropanol and mixtures thereof. A preferred alcohol is isopropanol. Another preferred alcohol is normal propanol.

By the method of the present invention, the additive composition is pumped into the borehole. This can be accomplished by several techniques well known in the art. By one technique the additive composition is pumped along the length of the stuck drill string in a continuous process. The additive composition may optionally be mixed with 10 vol.% to 50 vol.% preferably 10 vol.% to 25 vol.% water or brine and optionally surfactants and/or dispersants. The addition of water or brine results in a lower cost additive fluid which is still effective but requires more time to release the pipe due to the decreased concentration of chemical dehydrating agent.

The mud cake can alternately be treated by a spotting fluid technique. Spotting fluids are viscous fluids which remain in place and do not mix with the drilling fluid to any great degree. The spotting fluid is formulated by weighting the additive composition so as to contact the drill string in the area adjacent the mud cake. Weighting materials are alcohol, water and brine soluble or dispersable materials and are added to weight the additive fluid to a density between 8.33 lb/gal and 15 lb/gal or more as needed. Weighting materials are well known in the art and include a large number of the metal salts of such metals as sodium, potassium, calcium, magnesium, aluminum, barium, iron, nickel, cobalt, manganese and strontium. The actual salt used must be both water/brine soluble or dispersible as well as alcohol or dispersible and compatible with the corrosion inhibiter used.

Optionally a viscosifier such as asbestos or an alcohol soluble viscosifying polymer such as polysaccharide, an ethylene oxide-propylene oxide copolymer, a polyvinyl methyl ether polymer or hydroxyethyl cellulose can be added to the additive composition in an amount of about 2 to about 50 preferably about 2 to about 20 pounds per barrel sufficient to thicken the fluid so that it can be left quiescent in the borehole and not mix appreciably with the drilling fluid. Polysaccharide has a typical molecular weight of $10^4$ to $10^7$. Hydroxyethyl cellulose has a typical molecular weight of $10^4$ to $10^6$. Polyvinyl methyl ether polymer has a typical molecular weight of $10^5$ to $10^6$. Ethylene oxide-propylene oxide copolymer has a typical average molecular weight of 5,000 to 50,000 and preferably 5,000 to 15,000. Such an additive composition is an effective spotting fluid which can be positioned in the borehole by techniques well known in the art to treat the binding area.

The mechanism of the present invention is not known with mathematical certainty. It is theorized that the additive composition of the method of the present invention act to dehydrate and thereby crack the mud cake around the stuck pipe section. Upon dehydration, the pressure is equalized and the pipe freed.

The superiority of the method of the present invention is evidenced by its overall cost effectiveness. Per barrel fluid cost may be in some cases more costly than that of fluids presently used for similar purposes such as diesel oil. However, when the hourly rental of a non productive drilling rig is taken into account it is immediately seen that the fluid cost is a relatively small portion of the total drilling cost. A method which produces fastest results probably becomes the most cost effective overall and by such a cost analysis the superiority of the present method over that of the prior art is evident. The method of the present invention is noted for its speed and efficiency in releasing a stuck drill string.

The present invention is better demonstrated by way of Example.

EXAMPLE 1

Additive compositions of the invention were evaluated in a laboratory apparatus to determine their effectiveness as a drilling pipe release agent.

The evaluation was carried out in the following apparatus.

A 7.0 cm. Watman 42 filter paper was placed in an vacuum funnel measuring 7.859 cm. in diameter. A flat metallic plate measuring 4.445 cm. in diameter and having a thickness of 1.588 mm. was pressed against the filter paper in the funnel. A vacuum was pulled on the suction side of the funnel until a reading of from 0.5 to 1.0 mm. of mercury was attained. A standard fluid mud composed of water, clay and a lignosulfonate dispersant was poured into the funnel until the funnel was filled with the mud. The vacuum was maintained for a period of thirty minutes during which time a mud cake formed around the metal disc. Thereafter excess mud was removed from the funnel using a syringe without disturbing the metal plate until only the cake remained in place around the metal plate.

The test fluid was then poured into the vacuum funnel and permitted to remain in contact with the upper surface of the mud cake and plate. A brass rod was attached to the metal plate which extended upwards from the funnel. The other end of the rod was attached to a flexible line that passed through two pulleys mounted on a horizontal beam to effect a upward vertical force on the metal plate. A 1,000 gram weight was attached to the line to induce separation of the metal plate from the filter cake. At the same time at the 1,000 gram weight was attached to the flexible line a timer clock was started. The time for the plate to separate from the filter cake was recorded. It was observed for each test number that the mud filter cake had substantially cracked and been destroyed from dehydration which is the reason the plate was released.

The test procedure permitted a qualitative comparison of the additive. The results obtained are reported here.

TABLE I

| | | TEST RESULTS | | |
|---|---|---|---|---|
| Test # | Additives | Additive Concentration Vol % | Diluent | Release Time (Seconds) |
| 1. | n-Propanol | 100 | — | 1120 |
| 2. | Diesel Oil | 100 | — | 7200 |
| 3. | Magcobar PIPE LAX ® | 100 | — | 7300 |
| 4. | Magcobar PIPE LAX ® | 2.38 (1) | Diesel Oil | 5400 |
| 5. | Baroid SKOT-FREE ® | 2.38 (1) | Diesel Oil | 4600 |

(1) 1 gal/bbl Diesel Oil

EXAMPLE 2

Additional additive compositions of the invention were evaluated in the laboratory to determine their potential effectiveness as a pipe release agent. The evaluation was carried out in the following manner.

A drilling fluid was prepared by treating a field top hole mud with 6 lbs/bbl lignosulfonate and sufficient caustic soda to achieve a pH of 10.5. This fluid was aged overnight at 150° F. to insure chemical equilibrium, cooled to room temperature, then placed in filtration cells. A pressure differential of 100 psi was applied and filtration of the mud continued until 20–25 cc. of mud filtrate was collected. The pressure was then released, the cells dismantled, and the excess mud was removed leaving the mud filter cake in place. This cake was approximately ¼" thick. The fluid to be tested was then placed in the cell which was replaced in the holding apparatus. The 100 psi pressure differential was again applied and a timer was started to measure the time of exposure. The effectiveness of several compositions was then determined based on the appearance of the mud cake after exposure to the composition of this invention. The desired effect was cake dehydration loss of cake integrity evidenced by cracking and subsequent destruction.

This test procedure permitted a qualitative comparison of the additive. The results are reported here and compared with commercially available systems.

TABLE II

| | TEST RESULTS | |
|---|---|---|
| ADDITIVE | EXPOSURE TIME | EFFECT |
| 100% Methanol | 2 min. | Severly cracked |
| 100% Ethanol | 2 min. | Severly cracked |
| 100% N—Propanol | 2 min. | Severly cracked |
| 100% Iso-Propanol | 2 min. | Severly cracked |
| 50% Methanol in Fresh Water | 2 min. | Moderate Cracking |
| 50% Methanol in Brine (1) | 2 min. | Cracked |
| 75% Methanol in Fresh Water | 2 min. | Cracked |
| 75% Methanol in Brine (1) | 2 min. | Cracked |
| Diesel Oil | 2 hrs. 45 min. | Cake intact |
| 2% Baroid SKOT-FREE ® (2) in Diesel | 2 hrs. 45 min. | Cake intact |
| Field Invert Oil Mud | 2 hrs. 45 min. | Cake intact |
| 2% Magcobar PIPE LAX ® (3) in Diesel | 2 hrs. 45 min. | Cracked |

(1) Brine Water approx. 100,000 ppm NaCl.
(2) A commercially available surfactant liquid added to diesel oil, used in the industry as a spotting fluid to release stuck drill pipe.
(3) A commercially available blend of surface active agents used in the industry to decrease the interfacial tension between oil and water.

EXAMPLE 3

Additional laboratory tests were made to determine the effect of various viscosifying polymers on the flow characteristics of the additives of this invention. The results obtained are reproduced here.

COMPOSITION OF FLUIDS

A. 100 cc of an ethylene oxide-propylene oxide copolymer, molecular weight 10,000, mixed with 300 cc of methanol.
B. 2 lbs/bbl XC ® Polymer (high molecular weight linear polysaccharide) in fresh water solution diluted 1:1 with methanol.
C. 3 lbs/bbl Union Carbide QP-15000 hydroxyethyl cellulose polymer in fresh water diluted 1:1 with methanol.
D. 100 cc (50% solution in fresh water) GAF M-154 polyvinyl methyl ether polymer mixed with 300 cc methanol.

PROPERTIES

| COMPO-SITION | Apparent Viscosity (Centipoise) | Plastic Viscosity (Centipoise) | Yield Point lb/100 ft$^2$ |
| --- | --- | --- | --- |
| A. | 22.25 | 22.0 | 0.5 |
| B. | 9.50 | 4.5 | 10.0 |
| C. | 20.75 | 14.5 | 12.5 |
| D. | 21.75 | 21.5 | 0.5 |

A lignosulfonate mud filter cake previously described was exposed to each of these fluids to determine their effect on cake dehydration and cracking. The results were as follows:

TABLE III

| | TEST RESULTS | |
| --- | --- | --- |
| COMPOSITION | EXPOSURE TIME | EFFECT |
| A. | 5 min. | Severe cracking |
| B. | 30 min. | Slight cracking |
| C. | 30 min. | Slight cracking |
| D. | 10 min. | Severe cracking |

As shown in these examples, alcohol/water soluble polymers may be used to increase the viscosity of the additives of this invention. While in some cases the additive appears slightly less effective after viscosifying, the exposure time which resulted in cracking is still considerably less than that obtained with commercially available products.

EXAMPLE 4

It is found that after a suspension in drilling, drilling cannot be resumed because the drill string is stuck in the borehole due to mud caking. An alcohol mixture of predominantly n-propanol and isopropanol is introduced into a mixing tank. A preformulated weighting composition consisting of a calcium chloride brine, fluid weight 11 lbs/gal, is added to the mixing tank and mixed well. The additive composition is pumped into the borehole so as to contact the drill string and the mud cake and allowed to remain quiescent for a period of time. The drill string is thereby freed from the mud cake and drilling is resumed.

EXAMPLE 5

It is found that after a suspension in drilling, drilling cannot be resumed because the drill string is stuck in the borehole due to mud caking. An alcohol mixture of predominantly methanol and 2 lbs/bbl to 20 lb/bbl ethylene oxide-propylene oxide copolymer is mixed in a mixing tank. The additive composition is pumped into the wellbore so as to contact the drill string and the mud cake and allowed to remain quiescent for a period of time. The drill string is thereby freed from the mud cake and drilling is resumed.

The principle of the invention and the best mode contemplated for applying the principle have been described. It is to be understood that the foregoing is illustrative only and that other means and techniques can be employed without departing from the true scope of the invention defined in the following claims.

What is claimed is:

1. An improved method for releasing a stuck drill string in the borehole of an underground formation employing an aqueous drilling fluid, the method comprising contacting the stuck drill string with an additive composition effective in reducing the annular pressure exerted by the drilling fluid or mud cake against the stuck drill string and thereby releasing the stuck drill string, the additive composition comprising a major amount of an alcohol selected from the group consisting of methanol, ethanol, normal propanol, isopropanol and mixtures thereof.

2. The method of claim 1 wherein the composition additionally comprises from 10 vol.% to 50 vol.% of a material selected from the group consisting of water and brine.

3. The method of claim 1 wherein the composition additionally comprises from 10 vol.% to 25 vol.% of a material selected from the group consisting of water and brine.

4. The method of claim 1 wherein the composition additionally comprises a viscosifying material.

5. The method of claim 1 wherein the composition additionally comprises from 2 lb/bbl to 50 lb/bbl of a viscosifying polymer selected from the group consisting of polysaccharide, an ethylene oxide-propylene oxide copolymer, a polyvinyl methyl ether polymer and hydroxyethyl cellulose.

6. The method of claim 1 wherein the composition additionally comprises from 2 lb./bbl. to 20 lb./bbl. of a viscosifying polymer selected from the group consisting of polysaccharide, an ethylene oxide-propylene oxide copolymer, a polyvinyl methyl ether polymer and hydroxyethyl cellulose.

7. The method of claim 1 wherein the composition additionally comprises from 2 lb/bbl to 20 lb/bbl of asbestos.

8. The method of claim 1 wherein the composition additionally comprises from 2 lb./bbl. to 50 lb./bbl. of asbestos.

9. The method of claim 1 wherein the composition additionally comprises a weighting material.

10. The method of claim 1 wherein the additive composition is isopropanol.

11. The method of claim 1 wherein the additive composition is normal propanol.

12. An improved method for releasing a stuck drill string in the borehole of an underground formation employing an aqueous drilling fluid, the method comprising contacting the stuck drill string with an additive composition effective in reducing the annular pressure exerted by the drilling fluid or mud cake against the stuck drill string and thereby releasing the stuck drill string, the additive composition consisting of an alcohol selected from the group consisting of methanol, ethanol, normal propanol, iso-propanol and mixtures thereof.

13. The method of claim 12 wherein the alcohol is iso-propanol.

* * * * *